Feb. 27, 1940.         O. SHACKLELFORD              2,191,591
                    LEHR STACKER FOR GLASSWARE
                       Filed March 16, 1937        7 Sheets-Sheet 2

Inventor
Orie Shackelford
By
Cushman Darby & Cushman
Attorney

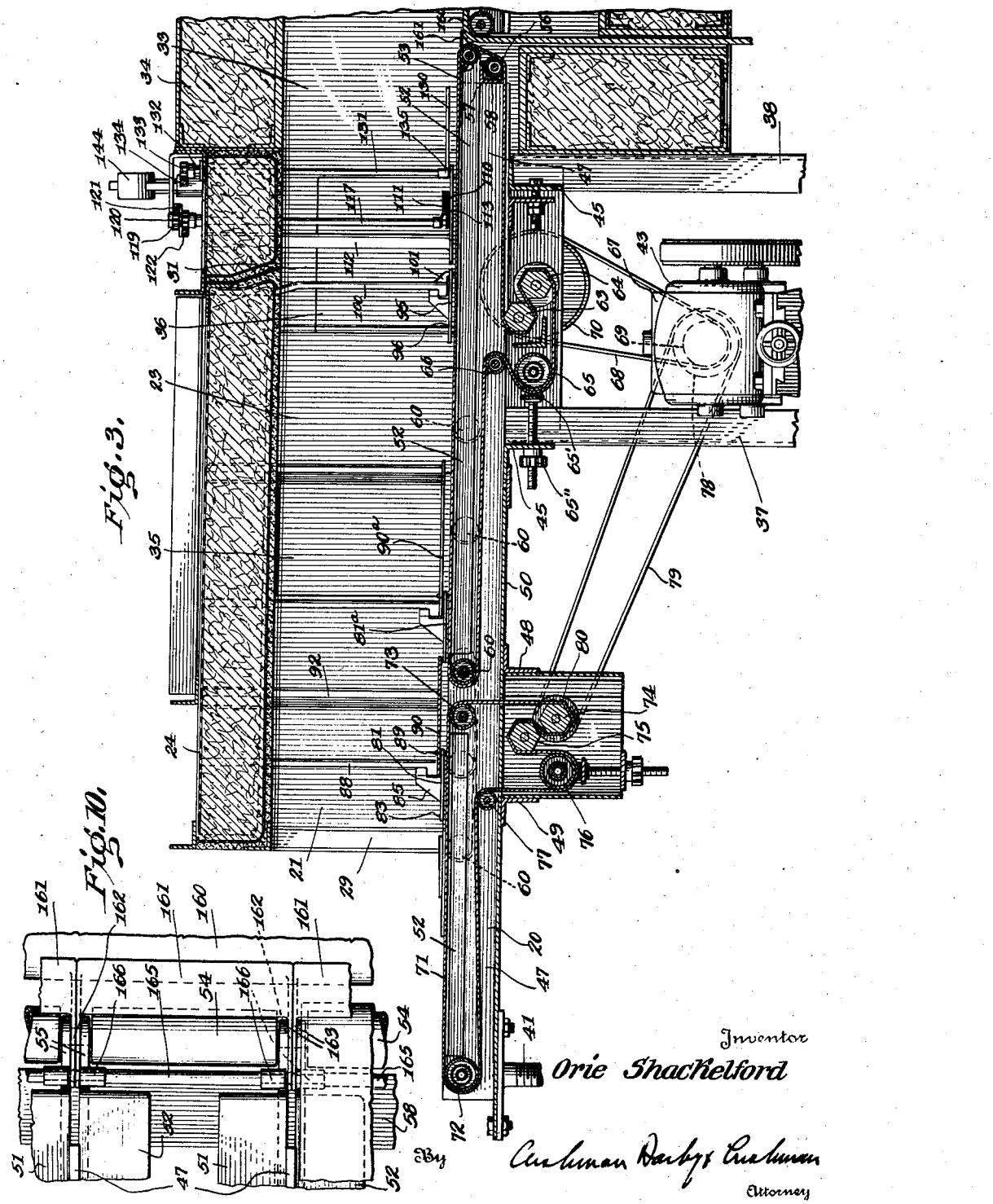

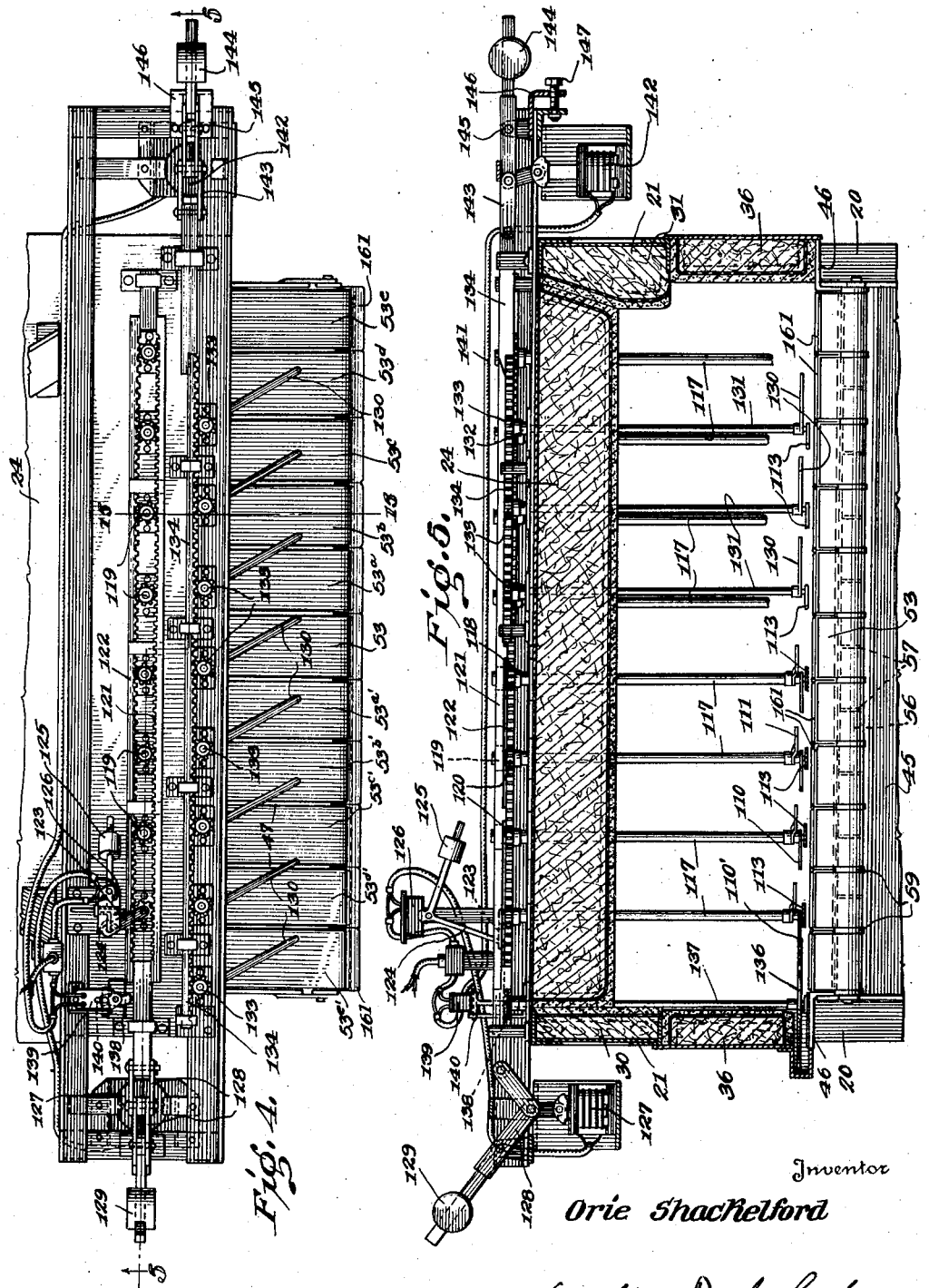

Feb. 27, 1940.   O. SHACKLELFORD   2,191,591
LEHR STACKER FOR GLASSWARE
Filed March 16, 1937   7 Sheets-Sheet 5
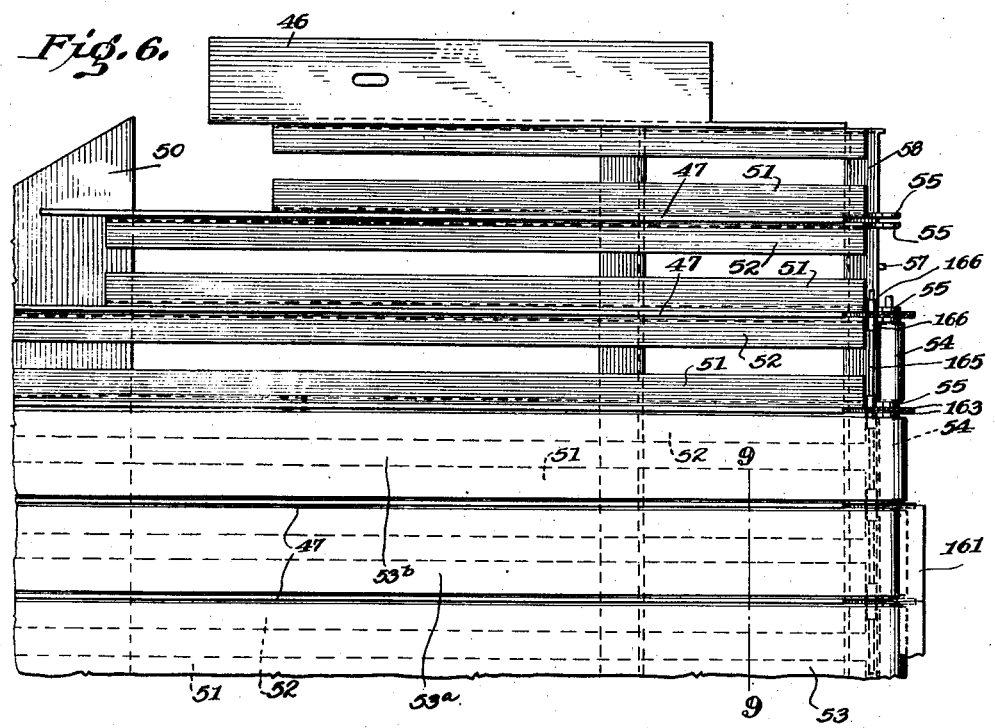
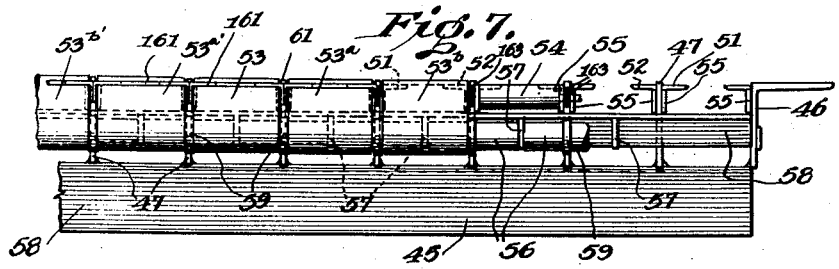
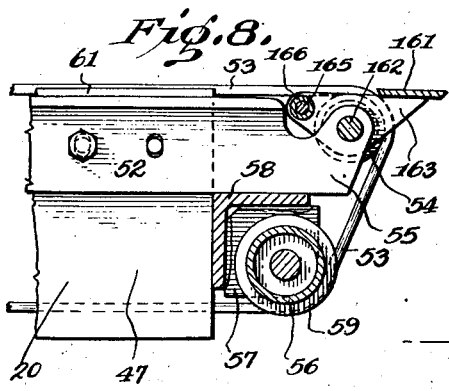
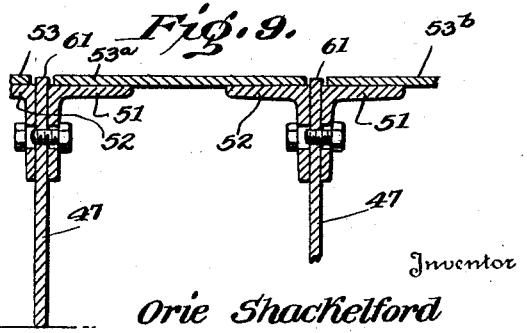
Inventor
Orie Shackelford

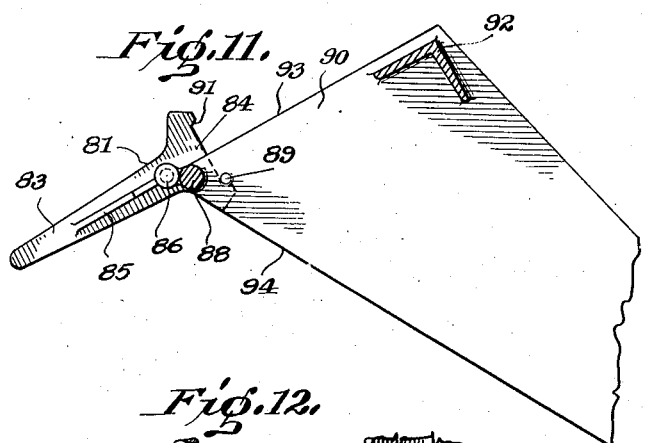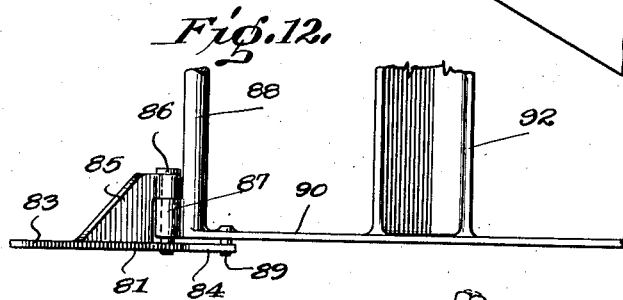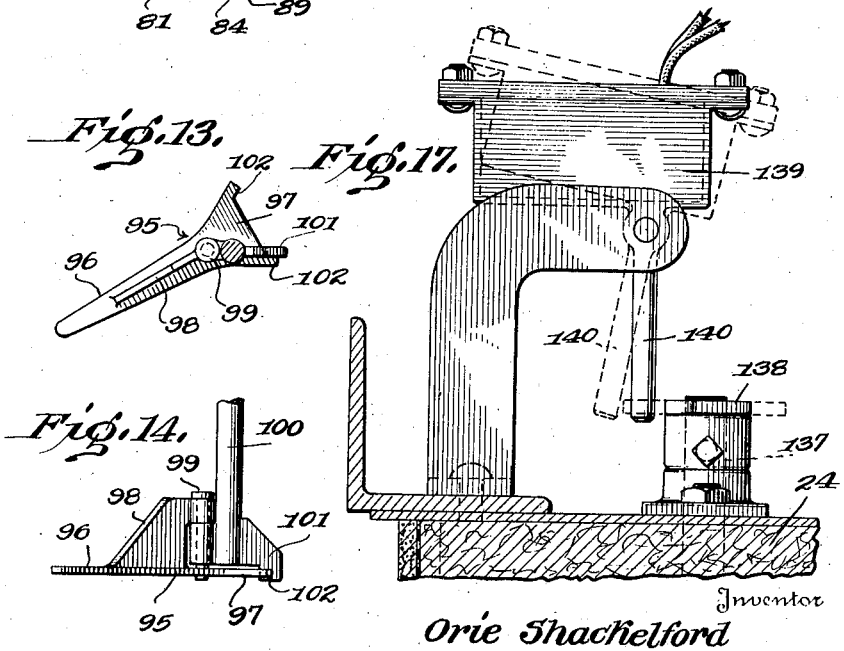

Feb. 27, 1940.   O. SHACKLELFORD   2,191,591
LEHR STACKER FOR GLASSWARE
Filed March 16, 1937    7 Sheets-Sheet 7
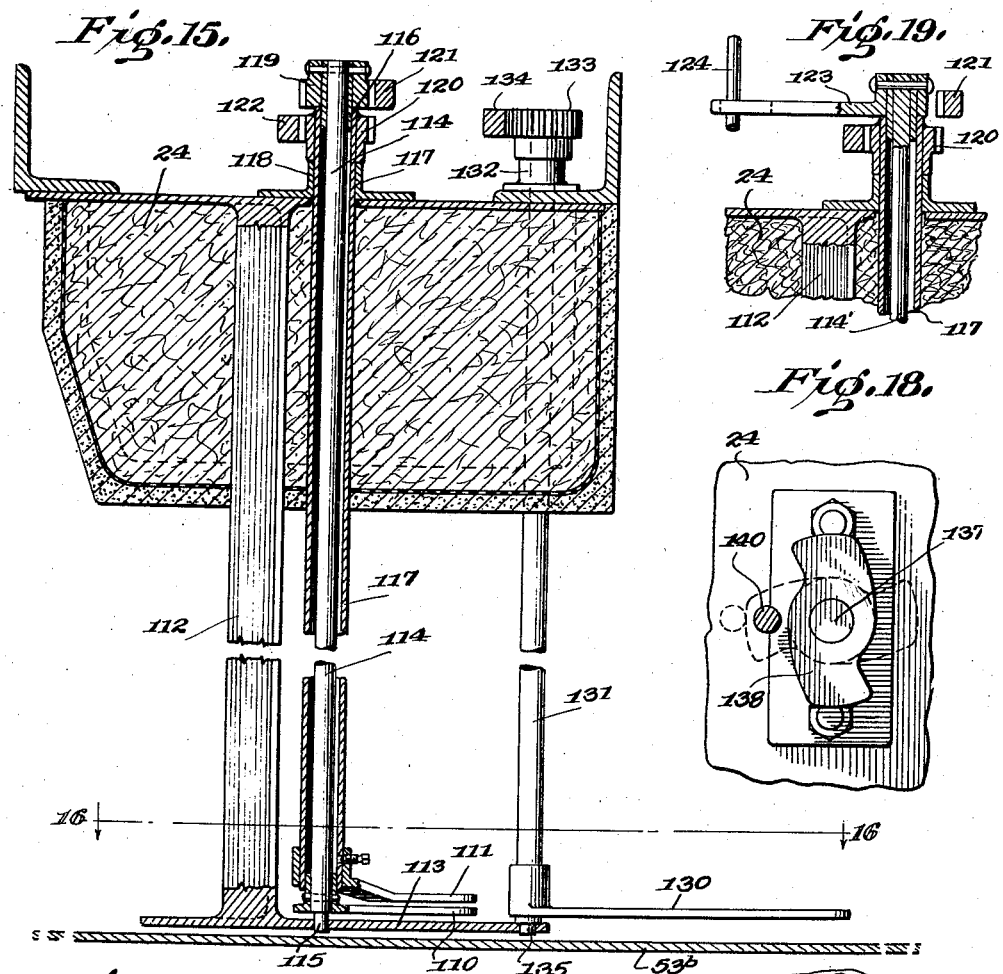
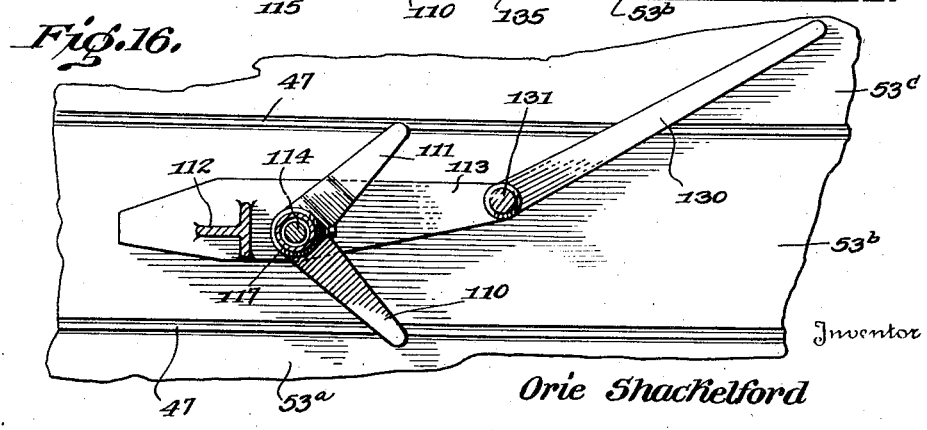
Inventor
Orie Shackelford Patented Feb. 27, 1940

2,191,591

UNITED STATES PATENT OFFICE 2,191,591

LEHR STACKER FOR GLASSWARE

Orie Shackelford, Fairmont, W. Va.

Application March 16, 1937, Serial No. 131,215

23 Claims. (Cl. 49—47)

This invention relates to automatic stackers for glassware. More particularly, it relates to an apparatus for distributing articles of glassware in a particularly desired manner and for transferring them to an annealing lehr, a decorating lehr, or an equivalent apparatus.

It is a primary object of the present invention to provide a stacker which is of markedly simple construction, having a minimum number of moving parts and which is entirely automatic in its operation. It is a further object to provide a stacker which will arrange the bottles or other articles of glassware in the desired relation, without the use of glassware handling tongs or other devices which positively grip the ware. Stackers of the latter type are objectionable, first, because there is some likelihood that the tongs will damage the ware and, secondly, because they necessarily include complicated mechanisms which occasionally get out of order and interrupt the smooth operation of the stacker, the lehr, the forming machine and associated machines in the plant.

It is a further object of the invention to provide a stacker which may be completely enclosed within heat insulating walls, so that there is substantially no heat loss from the articles during the time they are being distributed to the proper position for transfer to the lehr.

Preferably the stacker is enclosed within a chamber which communicates with the hot end of the lehr, and, in fact, constitutes a continuation of the lehr tunnel itself.

It is a further object of the invention to provide a stacker which effects a novel distribution of articles of glassware on the belt of a tunnel lehr. This novel distribution serves to prevent the creation of longitudinal drafts of air through the tunnel in the spaces or channels between longitudinal rows of articles on the belt. This object is preferably accomplished by staggering the articles, in accordance with a regular plan and sequence, so that the centers of the articles in alternate transverse rows are offset from the centers of the articles in the adjacent transverse rows. By this arrangement, it is not only possible to effect a closer packing of articles on the lehr belt, but also, no longitudinal channels between longitudinal rows of bottles are formed. Therefore, longitudinal drafts are restrained and the ware is annealed equally on all sides.

In accomplishing the objects of the invention, a plurality of pivoted deflectors or ushers are positioned above a conveyor or a plurality of parallel conveyors in an insulated chamber. Each deflector serves to guide alternate articles to different paths on the conveying means. That is, a first deflector divides the single incoming line of bottles into two paths. Additional deflectors divide those two lines into four, and subsequent deflectors again divide the lines into eight, etc. By properly positioning the deflectors, the articles will be distributed to a plurality of equally spaced, parallel paths longitudinally of the lehr tunnel.

In order to effect more accurate control of the spacing and positioning of the articles, means are provided for forming the articles into transversely aligned rows. Preferably, the latter means takes the form of bottle or article arresting means which arrests the movement of one bottle in each path when it reaches a predetermined transverse line. Moreover, the arresting means holds the several bottles on that line until the last bottle to arrive has reached its place in line, whereupon means actuated by the last bottle release all of the bottles, so that they move in unison toward and into the lehr. As soon as the transverse row of bottles has been released, the arresting means again become operative to accumulate another transverse row of bottles and the cycle is repeated.

The staggering of the individual articles in each transverse row with respect to the preceding and succeeding rows is effected preferably by means of deflecting arms adapted to shift the bottle in every second row laterally a predetermined amount with respect to the corresponding bottles in the other rows. These deflecting arms are preferably controlled and shifted to their deflecting position by the passage of every second bottle in a particular path past a predetermined point.

The invention also includes many other objects and advantages and consists in many novel details of construction and combinations of part, as shown in the accompanying drawings and explained below. These additional objects and advantages will be apparent to one skilled in the art, when the invention is considered in connection with the following description of a preferred embodiment.

In the drawings:

Figure 3 is a central longitudinal view taken on the line 3—3 of Figure 2.

Figure 4 is a top plan view, with certain parts removed, of the actuating means for the arresting fingers and deflecting arms.

Figure 5 is a transverse, vertical, sectional view on line 5—5 of Figure 4.

Figure 6 is a plan view of the conveyor platform with certain parts removed.

Figure 7 is an end view of Figure 6.

Figure 8 is a side view, partly in section, of the construction shown in Figure 6 and specifically illustrating the transfer plate.

Figure 9 is a transverse, sectional view of the platform, taken on line 9—9 of Figure 6.

Figure 10 is a plan view of the transfer plate shown in section in Figure 8.

Figure 11 is a plan view, partly in section, showing a preferred form of deflector and guide plate.

Figure 12 is a side elevation of Figure 11.

Figure 13 is a plan view of another deflector.

Figure 14 is a side elevation of the same.

Figure 15 is an enlarged, vertical, longitudinal, sectional view taken on line 15—15 of Figure 4.

Figure 16 is a plan view partly in section taken on line 16—16 of Figure 15.

Figure 17 is an elevation of a mercury switch and the cam for controlling its position.

Figure 18 is a plan view of the same cam, and

Figure 19 is a vertical, sectional view showing a detail of a control for another mercury switch.

Figure 1:
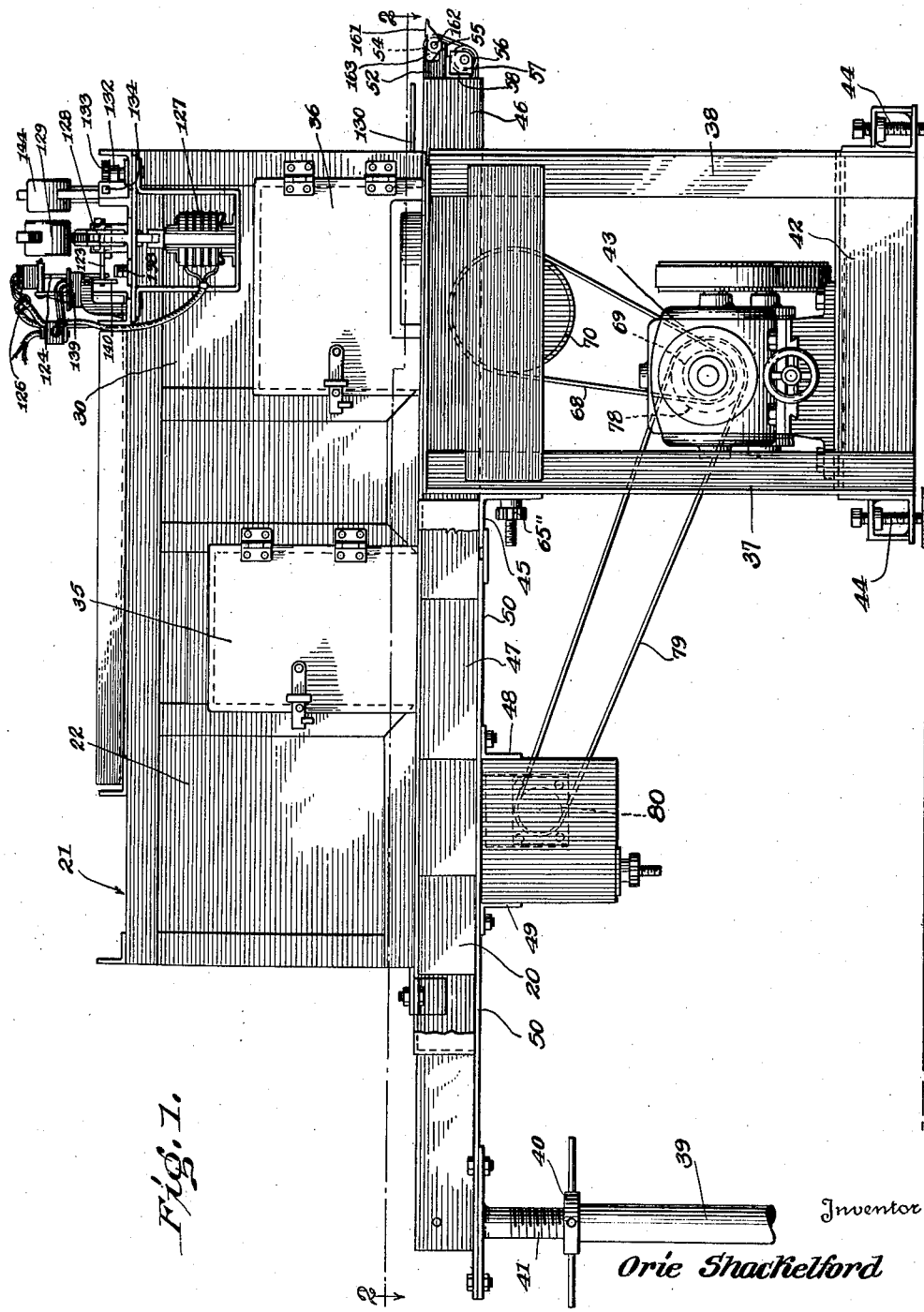
Figure 1 is a side elevation of the stacker.

Upon a main frame 20 there is an insulated housing or casing 21, comprising side walls 22, 23, and a top wall 24. The walls of the casing may conveniently be made up of sheet metal plates 25, rock wool or asbestos insulation 26 or the like and a layer of heat insulating plaster 27 spread on a metal lath 28. Any other convenient wall structure may be used, so long as it has the proper heat insulating qualities.

Figure 2:
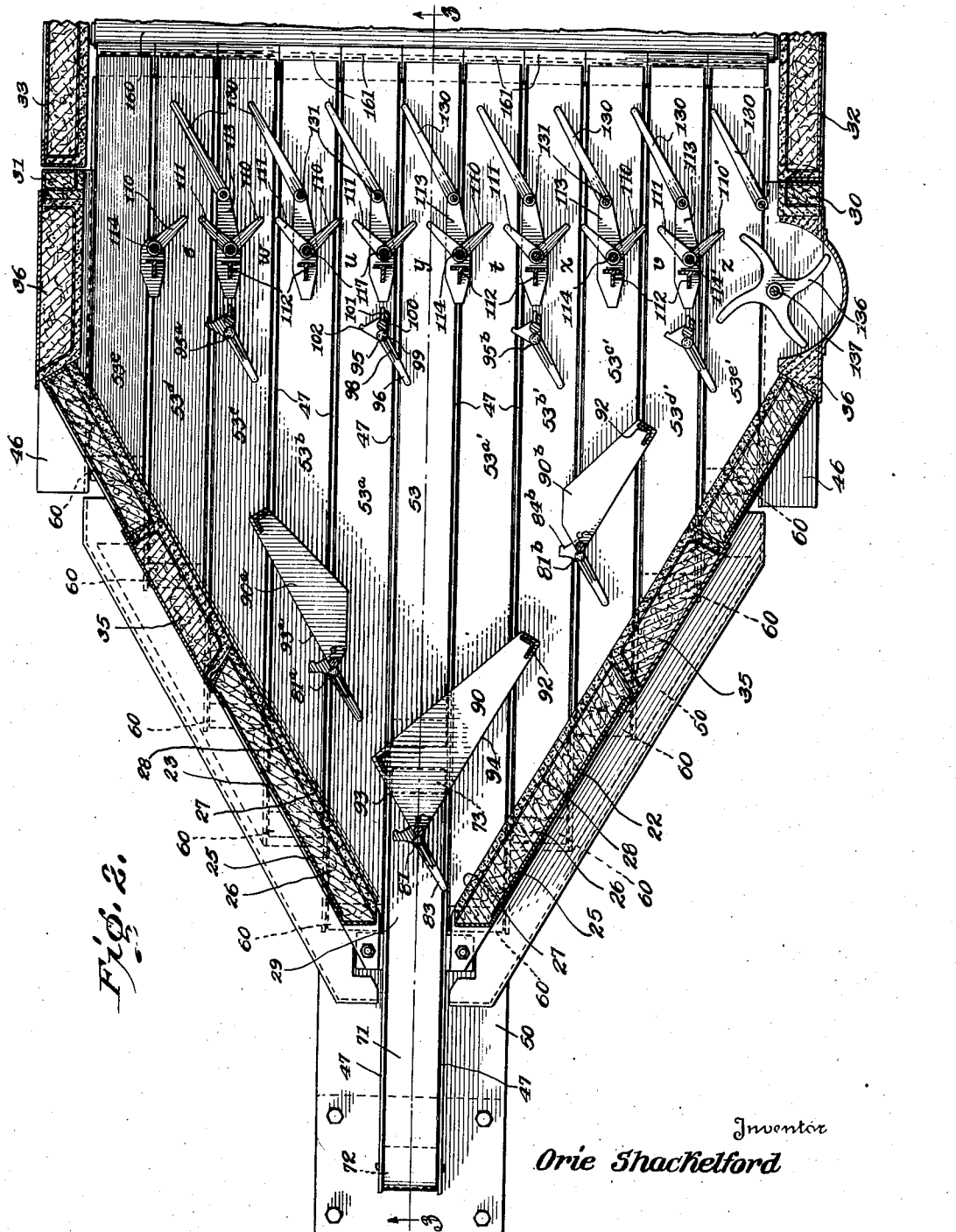
Figure 2 is a horizontal sectional view taken on line 2—2 of Figure 1, showing the stacker in operative relation to a lehr.

The vertically disposed side walls 23, 23 terminate forwardly in fairly closely spaced relation to provide an entrance opening or door 29, leading into the interior of the casing. The side walls diverge from each other rearwardly as shown in Figure 2 and terminate in parallel side sections 30, 31 which may be placed in longitudinal alignment with the side walls 32, 33 of an associated annealing lehr. The top wall 24 also may be placed in alignment with the top wall 34 of the lehr, as shown in Figure 3.

The particular construction of the lehr is immaterial and is not a part of the present invention, but reference is made to my copending application Serial No. 131,216, filed March 16, 1937, for a disclosure of a lehr particularly adapted for use with a stacker of the present type.

The side walls of the stacker casing may be provided with doors 35, 36, substantially as shown, to permit access to the interior of the casing.

The base 20 is made up of a plurality of structural steel elements, such as angles, beams, and plates, assembled in a novel manner to provide a support for the casing and a novel form of platform for the belt conveyors, hereinafter described. The base 20 is supported upon adjustable legs 37, 38 at one end and a vertically adjustable post 39 at the other. A collar 40 is journalled on the tube 39 in threaded engagement with a screw 41 for raising and lowering the front end of the stacker. The legs 37, 38 and the platform 42 for the motor 43 are supported for vertical adjustment by means of the threaded bolts 44, as shown in Figure 1. A pair of transverse angle beams 45 are supported by the legs 37, 38, and serve as transverse supporting means for side angle beams 46 and a plurality of parallel vertical plates 47.

Additional transverse angle bars 48, 49 are disposed beneath the plates 47 and a bottom plate or plates 50, as shown in Figures 1 and 3.

The longitudinally arranged parallel plates 47 carry angle iron strips 51, 52 on their side faces, as shown in Figures 6 and 9. The upper faces of these angle strips serve as supporting means for the edges of the parallel conveyor belts 53, 53a, etc. The belts are trained about a series of upper rollers 54, journalled between extensions or ears 55, preferably formed integrally with the vertical webs of the angle strips 51, 52, as shown in Figures 6 and 7.

The belts are also trained about a lower series of rollers 56 which are axially offset from the rollers 55 and journalled in depending plates 57 welded to the transverse angle iron 58. These rollers 56 are provided with central annular flanges 59 which serve as spacer rings between the several belts.

The longitudinal, parallel plates 47 are respectively of varying lengths, as shown in Figures 2 and 6 and, at their forward ends, carry rollers 60, about which the several belts 53 are trained. The belt supporting angle irons 51, 52 are of corresponding lengths, so that a plurality of longitudinally arranged, parallel conveyors of different lengths are provided, as shown in Figure 2. The several belts are spaced apart by the flanges 59 on the rollers 56 and also, along the article supporting stretches, by the upper ends 61 of the plates 47 (Figure 9).

The belts may conveniently be driven by the construction shown in Figure 3. The several belts are led forwardly under the rollers 56 to a hexagonal roller 63 and thence about a similar driving roll 64. The hexagonal rollers 63 and 64 are engaged with each other by two spur gears secured to the ends thereof (not shown). They are then trained about a forwardly disposed, adjustable roll 65, and a fixed roll 66. From the latter, the belts are led forwardly and each is trained about its own individual roll 60. The tension roll 65 is carried in a bracket 65', adjustable by means of a screw and nut construction 65''. Power is transmitted from the motor 43 through a speed reducer 67 to the driving roll 64 by means of a chain 68 and sprockets 69, 70.

The conveyor platform of the stacker also includes a lead-in conveyor 71, supported in a manner similar to the belts 53, and trained about a forward roll 72 and a rear roll 73. These rolls may be journaled in the centermost pair of longitudinal plates 47, as shown at the left of Figures 1 and 3. The belt 71 is driven by a pair of hexagonal rolls 74, 75 and is trained over tension roll 76 and idler 77, in a manner generally similar to the corresponding means for the belts 53. The driving roll 75 receives power from a sprocket 78 associated with the speed reducer 67 and chain 79 and sprocket 80. Because of the different ratios between the pulleys 69, 70 and 78, 80, the belt 71 will be driven at a higher relative speed than the belts 53.

The means for distributing the bottles, or other articles of glassware on the several belts 53, 53a, etc., will now be described. Referring to Figure 2, a pivoted usher or deflector 81 is supported adjacent the entrance 29, above the lead-in conveyor 71. This usher comprises a forwardly projecting fin portion 83 and a flared, fishtail rear portion 84. The usher is supported by a vertical central flange 85 carrying a pivot pin 86 extending through a boss 87 associated with a vertical supporting rod 88. A stop pin 89 projects downwardly below a guide plate 90 in position to engage abutments 91 formed on the fishtail portion of the usher, thus limiting the lateral swing of the usher, as shown in Figure 11.

The guide plate 90 is supported by the rod 88 and by two vertical angle section members 92. These supports may conveniently extend upwardly and be attached to the top of the casing as indicated in Figure 3. The guide plate is formed with diverging guiding edges 93, 94, leading rearwardly from the pivot point of the usher 81. The edge 94 extends rearwardly and transversely of the conveying means a greater distance than the edge 93.

Rearwardly and laterally of the usher 81 and guide plate 90, there are provided two generally similar ushers and guide plate assemblies 81a, 90a and 81b, 90b, spaced respectively as shown in Figure 2.

Behind the last mentioned ushers and guide plates, a plurality of slightly different ushers or deflectors 95 are provided, spaced equally across the parallel conveyors. A preferred form of usher of this type is shown in Figures 13 and 14. The assembly comprises a forwardly projecting fin portion 96, a fishtail rear portion 97, a central flange 98, a pivot pin 99 and a vertical supporting rod 100. The latter may conveniently be formed with a depending stop flange 101, adapted to cooperate with abutments 102 formed on the fishtail portion as shown in Figure 13.

With ushers and guide plates of the type shown herein, positioned in accordance with the plan of Figure 2, the articles of glassware brought into the lehr on the lead-in conveyor 71 will be deflected and distributed in a novel manner over the surface of the conveying means. With the ushers in the positions shown in Figure 2, a first bottle will be deflected by the usher 81 to the left, whereupon it will be guided by the edge 93 of the plate 90 onto the conveyor belt 53a where it will be engaged by the usher 81a. During the course of its passage past the first usher, this first article will have shifted the position of the usher from that shown in Figure 2 to an opposite position, wherein the fin portion 83 thereof overlies the left edge of the belt 71. The first bottle will be shifted by the usher 81a from the belt 53a to the belt 53b and its passage will be further deflected by the guiding edge 93a until it is transferred to the belt 53c whereupon it will move longitudinally on that belt. Of course, during its passage past the usher 81a, the first bottle will shift the position of that usher to the left. As the first bottle is carried along on the belt 53c, it will engage the usher 95a and be deflected thereby to the belt 53d, where it will travel longitudinally until arrested by the bottle arresting fingers 110, 111, the specific structure of which is described below. Thus, one bottle has now arrived at a position in the stacker, predetermined both longitudinally and transversely therein.

The second bottle will be deflected by the usher 83 to the right, where it will be guided by the edge 94 of the guide plate 90 to the conveyor belt 53b'. Its passage by the usher 81 will, of course, shift the position thereof back to the original position, as shown in Figure 2. Thus, the usher 81 serves to direct succeeding bottles to alternate paths. The second bottle will travel along the belt 53b' until it engages the usher 95b, but during its passage, it strikes the fishtail end 84b of the usher 81b and shifts the position of the latter. The usher 95b transfers the second bottle to the belt 53a' where it is carried until it is arrested by the associated bottle arresting fingers 110, 111. Thus, two bottles have now arrived in transverse alignment at predetermined positions in the stacker.

It is unnecessary to trace the path followed by each bottle during its passage past the several ushers. It is sufficient to point out that the first bottle is ushered to the position s, Figure 2, the second bottle to the position t, the third bottle to position u, the fourth bottle to position v, the fifth bottle to position w, the sixth bottle to position x, the seventh bottle to position y and the eighth and last bottle to position z.

Thus, when the eighth bottle arrives at the transverse line where the several bottle arresting fingers 110, 111 are located, seven other bottles will be in position. The last bottle, upon its arrival at the position z, serves to actuate means for releasing all of the bottles, so that they move in unison in a transverse row toward the lehr, the release being effected by mechanism now to be described.

Referring to Figures 15 and 16, one of the bottle arresting assemblies is shown. A T-bar 112 extends downwardly from the top 24 of the stacker casing. Its lower end is provided with a guide or base plate 113. A vertical shaft 114 is journalled at its lower end 115 in this plate and at its upper end 116 in a concentric, tubular shaft 117 which extends downwardly in spaced relation thereto. The tubular shaft 117 is journalled at its upper end in a collar or the like 118 carried by the top of the casing. The inner shaft 114 extends upwardly above the tubular shaft and has a pinion 119 fixed thereon. The upper end of the outer shaft 117 likewise carries a pinion 120. A rack 121 engages the pinions 119 and a similar rack 122 engages the pinions 120. These racks are disposed on opposite sides of the pinions, forwardly and rearwardly of the stacker, whereby uniform movement of the racks in one direction or the other imparts clockwise rotation of one shaft and counter-clockwise motion to the other shaft mounted concentrically with respect thereto. Preferably, the racks are secured together as shown in Figures 4 and 5, one at a higher elevation than the other, and both are actuated by a common means, described below. The outer shaft 117 carries on its lower end, the bottle arresting finger 111, while the inner shaft 114 carries the other finger 110 of the pair.

Figure 19 shows the construction of the upper end of the bottle arresting fingers positioned at the right side of the stacker. The construction of the finger 111, its tubular shaft 117 and its pinion 120 is substantially the same as that previously described. The finger 110' is mounted on a shaft 114', provided at its upper end with a lever 123, instead of a pinion. Thus, the rack 121 is not in operative relation to the finger 110', but, on the contrary, the latter is free to move when it is engaged by a bottle on the belt 53e'. The lever 123 projects into the path of the depending arm 124 of a bell crank lever (Figures 19, 4 and 5), the other end of which carries a weight 125. The bell crank 124 is fixed to a mercury switch 126, in circuit with a solenoid 127. The armature of the solenoid is connected, through a toggle joint 128, to the double rack bar 121, 122. The construction is such that, when the finger 110' is deflected by the passage of the bottle on the conveyor 53e', the shaft 114' is oscillated, the bell crank 124 rocked, and the circuit to the solenoid 127 completed, whereby the rack bars 121, 122 are shifted to move the several fingers 110, 111' to inoperative position, to permit the passage of all of the bottles which have been held in the positions s to z inclusive, to travel in a transverse row on the conveyor belts toward the lehr. The weight 125 moves the finger 110' and the mercury switch 126 back to their original positions as soon as the bottle has passed, and the weight 129 shifts the bars 121, 122 in the opposite direction, again to move the bottle arresting fingers back to their original, bottle arresting position.

In addition to the means for arranging the bottles or other articles of glassware in a transverse row across the stacker, and the means for releasing the row for transfer to the lehr, the present invention contemplates means for staggering the several bottles in alternate rows, so their centers are offset with respect to the corresponding bottles in the preceding and succeeding rows.

This means will now be described.

Referring to Figure 2, it will be noted that there are a plurality of deflecting arms 130, one positioned behind each pair of bottle arresting fingers. These arms are adapted to assume two positions, one a deflecting position as shown in Figure 2, and the other an inoperative position, longitudinally aligned with the conveyors.

A preferred form of bottle staggering means is shown in Figures 15 and 16. A shaft 131 is journalled at its upper end in a bushing 132, above the casing top 24. The shaft carries a pinion 133 at its upper end, in engagement with a rack 134. The lower end of the shaft is journalled at 135 in the base plate 113. The deflector arm 130 projects from the shaft 113 in a rearward direction. Thus, movement of the rack bar 134 will serve to oscillate the shaft 131 to shift the position of the arm 130. The means for actuating the rack 134 to effect this result are shown in Figures 2, 4, 5 and 18. A starwheel 136 having four arms, is journalled adjacent the path of movement of the conveyor 53e, as shown in Figure 2 with its arms projecting over the conveyor. The starwheel shaft 137 projects upwardly through the top of the casing and carries a double arm cam 138 (Figure 18). A mercury switch or the like 139, mounted on the casing top, is provided with a depending arm 140 (Figures 5 and 18), in position to be engaged by the projections on the cam 138. The switch 139 is in circuit by means of an appropriate cable 141 with a solenoid 142, shown at the right of Figure 5. The armature of the solenoid is connected by means of a toggle joint 143 to the rack bar 134, which engages the several pinions on the deflector arm shafts 131.

Each bottle travelling on the conveyor 53e toward the position z will shift the starwheel 136 and the cam 138 one-fourth of a revolution. When a bottle shifts the cam to the dotted position shown in Figure 18, the depending arm 140 of the mercury switch 139 will be shifted and the circuit through the switch closed. Thereupon the solenoid 142 will be energized and the bar 134 will be shifted to the right in Figures 4 and 5. The pinions 133 will be rocked in a clockwise direction, to move the fingers 130 from the deflecting position shown in the several figures to a position in alignment with the conveyors. Because of the shape of the cam 138, the parts will be held in this position until another bottle moves the starwheel another one-fourth turn. When the deflector arms are in the inoperative position, the bottles will travel in straight lines toward the lehr, longitudinally from their respective positions s—z. When the next row of bottles has been collected by the bottle arresting fingers and a second bottle shifts the starwheel one-fourth turn, the cam will be moved to the full line position shown, Figure 18, the solenoid will be de-energized, the weight 144 will shift the rack bar, and the bottle deflecting arms will be shifted to the deflecting position shown in Figures 2, 4 and 16. Thus, when this second bottle serves to release the second transverse row of bottles, they will all have their positions shifted by engagement with the deflecting arms 130 and their centers will be staggered between the lines of the centers of the first row of bottles. Means are provided for varying the degree of deflection of the arms 30. Obviously, when bottles or jars having small diameters are being handled, the arms 30 which engage their peripheries must be deflected more than in the case of large bottles. A convenient means for effecting this adjustment is shown at the right of Figure 5, where the pivot 145 for the end of the toggle remote from the bar 134 is mounted on an adjustable slide 146, the position of which may be changed by a threaded bolt 147.

After the bottles pass the deflectors 130 they are conveyed by the conveyor belts 53 to the lehr. In accordance with the usual practice, the lehr includes a wide lehr belt 160, a fragmentary portion of which is shown in Figures 2 and 3. Such a lehr belt usually is formed from a wire mesh, comprising a plurality of spiral loops interlocked together to form a flexible wire apron. The belts 53, etc., and 71 also are preferably formed of similar wire mesh material. As is well known, both surfaces of wire mesh belts of this type are irregular or rough, because of the presence of the loops and links from which they are made.

Means are provided for transferring the articles from the parallel belts in the stacker to the lehr belt. This means preferably comprises a plurality of transfer plates 161 (Figures 3, 6, 7, 8 and 10) pivoted at 162 to the shafts upon which the rollers 54 are journalled. Each plate 161 has a down-turned terminal portion 163 having an aperture through which the aforesaid shafts extend. Also, a rearwardly extended portion carries a transverse rod 165 and rollers 166. These rollers underlie the several belts 53 and are pressed into engagement therewith by the weight of the plate 161 and any article supported thereon. As the belt 53 travels, its roughened undersurface, engaging the rollers 166, will shake the plate 161 and cause articles thereon to move toward the lehr conveyor, where they will be picked up and carried through the tunnel.

It is thought that the operation of the apparatus of the present invention will be entirely clear to one skilled in the art from a consideration of the above description. A line of bottles will be presented to the stacker on the lead-in conveyor 71, which, of course, may extend any desired distance from the stacker. By means of the ushers 81, 81a, 81b, their associated guide plates, and the ushers 95, etc., the articles will be distributed over the several conveyor belts in a plurality of transversely spaced paths. A row of articles will be collected by the arresting fingers 110, 111 in proper order and sequence, until a bottle approaches the position z. The last mentioned article will turn the starwheel 136 one-fourth of a revolution with the result that the solenoid 142 will shift the deflecting arms 130 from the position which they formerly assumed to the opposite position. This article will then strike the finger 110' which, by means of the arm 123, bell crank 124, switch 126 and solenoid 127 will shift all of the arresting fingers to inoperative position. Thereupon the transversely arranged row of bottles will move in unison on the conveyors toward the lehr. The fingers 130 will stagger them with respect to the preceding row of bottles. When bottles having bottoms with diameters less than the width of the plates 161 are carried to the end of the several belts 53, they will be received by the transfer plates 161 and transferred to the lehr belt by the shaking action previously described. Also, the plates 161 are slightly downwardly inclined toward the lehr belt as shown in Figures 3 and 8, to facilitate this transfer.

The cycle of operation will be repeated, and another transverse row of bottles will be collected. Of course, one row of bottles is being formed during the time that another row is being staggered and transferred to the lehr.

It must be understood that the present invention is not limited to the details of construction shown in the accompanying drawings or described above, but includes all devices coming within the scope of the appended claims and their equivalents.

I claim:

1. An automatic stacker comprising conveying means for articles of glassware, deflectors for positioning successive articles on different longitudinal lines on said conveying means, means for arresting the movement of the articles as they arrive at a predetermined line disposed transversely of the direction of movement of the conveying means, means for releasing the articles to permit the transfer of a transversely disposed row of articles into the lehr, and means for staggering the positions of the individual articles in successive rows in the lehr, said staggering means comprising a plurality of arms positioned to be engaged by and to shift the articles of alternate rows laterally with respect to the articles in the other rows.

2. An automatic stacker for glassware, comprising conveying means for articles of glassware, deflectors for positioning successive articles on different longitudinal lines of said conveying means in predetermined order and sequence, means for arresting the movement of an article on each of said different longitudinal lines as it arrives at a predetermined transversely disposed line, means for releasing the articles upon the arrival at said line of the last article in one sequence, to permit the conveyor to move a transversely disposed row of articles, means for rendering said arresting means operative to form a second transverse row of articles, additional deflecting means and means for projecting the same into the paths of movement only of said second transverse row of articles, thereby to stagger the position of each article in the second row laterally with respect to the corresponding article in the first-mentioned row.

3. An automatic stacker for articles of glassware comprising a conveyor movable longitudinally toward the entrance end of a lehr, deflectors associated with said conveyor for positioning the articles in predetermined spaced relation across the conveyor, means for restraining the movement of the articles with the conveyor until a transverse row is formed, means for releasing said row and for transferring the same to the lehr, additional deflectors, and means operative to project the same into the paths of movement of the articles in predetermined transverse rows of articles for shifting the position of each article in said row laterally with respect to the articles in a preceding row.

4. An automatic stacker for articles of glassware comprising means for arranging the articles in transversely disposed rows successively in front of a lehr, means for transferring the rows to the lehr, and a plurality of deflectors above the transferring means, one adjacent the path of movement of each article, said deflectors being movable to engage and stagger the articles of one row laterally with respect to the articles of a preceding row.

5. An automatic stacker for articles of glassware comprising means for arranging the articles in transversely disposed rows successively in front of a lehr, means for transferring the rows to the lehr, deflector means, and means for projecting the same into the paths of movement of the articles, thereby to shift the articles in one row laterally with respect to the articles of a preceding row, during their movement toward the lehr.

6. An automatic stacker for articles of glassware comprising means for arranging the articles in transversely disposed rows successively in front of a lehr, means for transferring the rows to the lehr, a plurality of deflectors, mounted for movement into position to be engaged by each article in certain of the rows transferred to the lehr for shifting the articles laterally with respect to the articles in other rows.

7. An automatic stacker for articles of glassware comprising means for conveying articles in a single line, means for forming said line into a plurality of lines, means for conveying said lines longitudinally toward a lehr, deflectors positioned above the last mentioned conveying means and operative upon alternate bottles in each of the last-mentioned lines to shift their positions laterally with respect to preceding and succeeding bottles therein.

8. An automatic stacker for lehrs comprising conveying means aligned with and of substantially the same transverse width as an associated lehr, means for successively bringing bottles up to a line extending transversely of the conveying means in a predetermined spaced relation along said line and across the conveying means, bottle arresting means, means actuated by a movement of the last bottle to approach said line to render said arresting means temporarily inoperative, to permit the conveying means to move said row toward the lehr, and means for staggering the bottles in alternate rows with respect to the bottles in preceding and succeeding rows, said staggering means being controlled by a movement of the last bottle to approach each alternate row.

9. A lehr stacker for articles of glassware comprising means for distributing the articles successively into rows of spaced articles arranged transversely of the lehr, means for moving said transverse rows longitudinally toward the lehr, and means for staggering the articles in certain transverse rows with respect to the articles in other rows, whereby the centers of the articles in said certain rows are spaced between longitudinal lines of the centers of the articles in the other rows, said last-mentioned means being controlled by the last articles to arrive in position in said certain rows.

10. A stacker comprising a chamber, a single line conveyor leading into the front end of the chamber, conveying means coextensive in width with the chamber and substantially parallel to the single line conveyor, a first pivoted deflector adapted to deflect alternate articles in said single line to two different paths, additional pivoted deflectors adapted to deflect the articles to a plurality of paths leading to a lehr, and positively actuated guide means mounted to be projected into each path at predetermined times for staggering certain articles in each path laterally out of alignment with the preceding ones, whereby the articles in the different paths are formed into rows in the lehr in staggered, overlapped relation to prevent air drafts longitudinally of the lehr between the rows of articles.

11. An automatic stacker for arranging articles of glassware for transfer to a lehr in a row extending transversely of the lehr, comprising conveying means disposed longitudinally of the lehr, pivoted deflectors associated with the conveying means adapted to direct articles along a plurality of paths spaced transversely thereof, vertically disposed shafts having pinions fixed thereon and carrying article arresting fingers above the conveying means associated with each path and arranged in a line transversely of the conveying means, rack means engageable with the pinions, a freely pivoted finger adjacent one of said paths in position to be actuated by the passage of an article in that path, and means controlled by the last-mentioned finger for actuating the rack means to rotate the pinions and shafts for shifting the article arresting fingers to inoperative position to release the articles previously arrested thereby, for transfer in a transversely extending row to the lehr.

12. A stacker in accordance with claim 11 characterized in that the rack means is urged in one direction by a weight and in the other direction by a solenoid, and in that the freely pivoted finger serves to control the action of the solenoid to shift the rack means and the bottle arresting fingers from one position to another.

13. In a stacker, the combination with conveying means and means for distributing articles of glassware on said conveying means in a plurality of spaced paths, of deflector means operative to stagger alternate articles in each path laterally with respect to other articles therein, said deflector means comprising vertically disposed shafts having deflector arms mounted thereon adjacent the upper surface of said conveying means, a reciprocable bar operatively connected to said shafts, and means controlled by the passage of articles in one of said paths for actuating said bar.

14. In a stacker, the combination with conveying means and means for distributing articles of glassware on said conveying means in a plurality of spaced paths, of deflector means operative to stagger alternate articles in each path laterally with respect to other articles thereon, said deflector means comprising vertically disposed shafts having deflector arms mounted thereon adjacent the upper surface of said conveying means, pinions on said shafts, a rack engaging said pinions, and means controlled by the passage of articles in one of said paths for actuating said rack.

15. A stacker in accordance with claim 14 characterized in that the means for actuating the rack comprises a starwheel positioned to be turned by the passage of articles in said one path, a weight, a solenoid, and a switch controlled by the position of said starwheel to energize the solenoid to shift the rack.

16. An automatic stacker for articles of glassware comprising a longitudinal, lead-in conveyor, another conveyor in alignment therewith, and a plurality of conveyor belts disposed in parallelism with the aforesaid conveyor laterally on both sides thereof, a pivoted usher associated with said lead-in conveyor for deflecting articles thereon alternately to belts on opposite sides thereof, additional pivoted ushers for deflecting and distributing the articles over said belts in predetermined sequence to move in laterally spaced paths, and means for driving the lead-in conveyor and the laterally disposed belts at different variable speeds of constant ratio.

17. An automatic stacker for articles of glassware comprising a horizontal support, vertical side walls upstanding from said support terminating in closely spaced relation at their forward ends to provide an entrance and diverging rearwardly to provide an interior chamber rearwardly of the entrance, a lead-in conveyor extending from the outside into the chamber through said entrance, and a plurality of parallel conveyors in said chamber of different lengths, the forward ends of said parallel conveyors terminating adjacent the diverging side walls and the rear ends thereof terminating on a line extending transversely of the chamber at right angles to said parallel conveyors.

18. An automatic stacker for articles of glassware comprising a horizontal platform, a plurality of parallel belt conveyors mounted on said platform, an insulated casing comprising side walls and a top supported upon said platform and providing a chamber above said conveyors, the forward side walls being angularly disposed and diverging from a forward entrance opening rearwardly toward a widened rear portion of the chamber, and means in the chamber for distributing articles of glassware introduced into the chamber through said entrance opening in a plurality of different diverging paths.

19. An automatic stacker for articles of glassware comprising a horizontal platform, a plurality of parallel belt conveyors mounted on said platform, an insulated casing comprising side walls and a top supported upon said platform and providing a chamber above said conveyors, the forward side walls being angularly disposed and diverging from a forward entrance opening rearwardly toward a widened rear portion of the chamber, and pivoted ushers in said chamber positioned to deflect articles of glassware along a plurality of different paths therein, certain of said paths following the diverging side walls to lead articles to opposite sides of the widened portion of the chamber.

20. An automatic stacker for lehrs comprising conveying means aligned with and leading toward the entrance end of the lehr, means for distributing articles of glassware laterally on the conveying means to cause successive articles to follow different longitudinal paths spaced transversely of the conveying means, means for arresting an article in each longitudinal row to form the articles into a transverse row across the conveying means, said article arresting means comprising a plurality of pairs of fingers pivoted on opposite sides of each longitudinal path, means for projecting the fingers into said paths to arrest the articles, and power means for swinging the fingers away from said paths to enable all of the arrested articles to move in a transverse row on said conveying means into the lehr.

21. In a lehr stacker, means for conveying a plurality of articles in transversely spaced longitudinally extending paths toward the lehr, and means for arranging said articles in straight, transversely extending rows, said means comprising a plurality of pairs of pivoted fingers on opposite sides of said paths, means for projecting said fingers across said paths and for holding them in such position until a complete transverse row has been formed, and means actuated by the last article to arrive in said row for positively swinging all of said fingers simultaneously away from said paths, to permit the transverse row of articles to move toward the lehr.

22. In a lehr stacker, means for conveying a plurality of articles in transversely spaced, longitudinally extending paths toward the lehr and means for arranging said articles in straight, transversely extending rows, said means comprising a plurality of fingers pivoted between said paths and arranged in pairs with adjacent fingers of adjacent pairs pivoted about the same axis, means for swinging said fingers across said paths and for holding them in such position until a complete transverse row has been formed, and means actuated by the last article to arrive in said row for positively swinging said fingers away from said paths to permit said row of articles to move toward the lehr.

23. In a lehr stacker, means for conveying a plurality of articles in transversely spaced, longitudinally extending paths toward the lehr and means for arranging said articles in straight, transversely extending rows, said means comprising a plurality of fingers pivoted between said paths and arranged in pairs with adjacent fingers of adjacent pairs pivoted about the same axis, means for swinging said fingers into said paths on lines inclined rearwardly toward the lehr to center the articles between the fingers on said paths, and to arrest their movement until a complete transverse row has been formed, and means actuated by the last article to arrive in said row for positively swinging all of said fingers simultaneously out of said paths to permit said transverse row of articles to move toward the lehr.

ORIE SHACKELFORD.